April 15, 1941.  J. MIHALYI  2,238,500
SHUTTER SPRING FOR SLIDING SHUTTERS
Filed Jan. 4, 1940
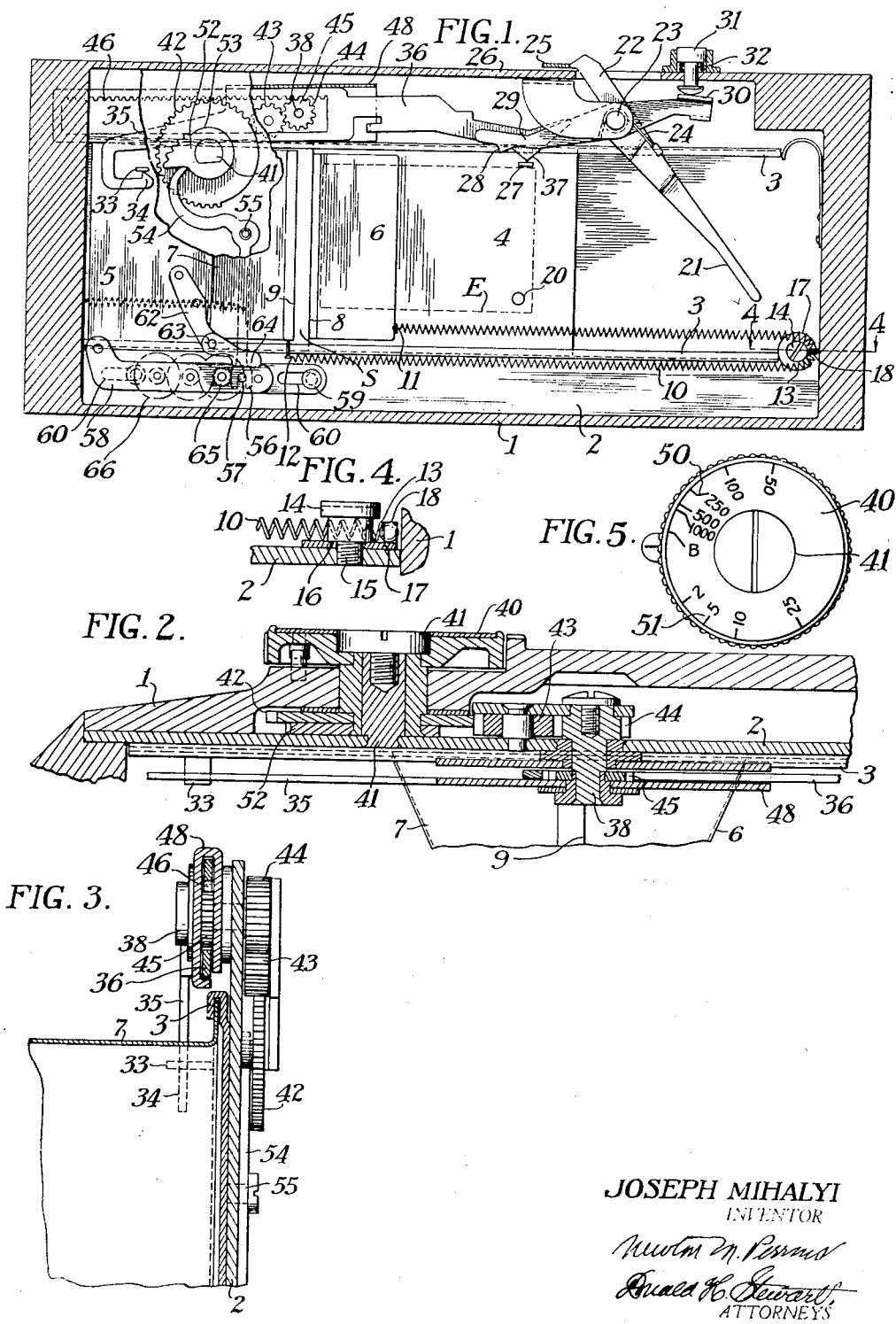
JOSEPH MIHALYI
INVENTOR
ATTORNEYS Patented Apr. 15, 1941

2,238,500

UNITED STATES PATENT OFFICE 2,238,500

SHUTTER SPRING FOR SLIDING SHUTTERS

Joseph Mihalyi, Rochester, N. Y., assignor to Eastman Kodak Company, Rochester, N. Y., a corporation of New Jersey Application January 4, 1940, Serial No. 312,398

6 Claims. (Cl. 95—55)

This application relates to photography, and more particularly to a spring construction for photographic shutters.

One object of my invention is to provide a shutter of the type employing a pair of sliding plates with a power spring which will always exert an equal pull upon each of the two shutter plates. Another object of my invention is to provide a spring construction for shutters of the class described, in which it is a simple matter to balance the power of a spring acting on one shutter plate against the power of a spring acting on the second shutter plate. Still another object is to provide a shutter with a simple type of factory adjustment for altering the spring pressure exerted on the two shutter plates, and other objects will appear from the following specification, the novel features being particularly pointed out in the claims at the end thereof.

In my copending application Serial No. 247,423, filed December 23, 1938, which has issued as Patent No. 2,206,105, dated July 2, 1940, I have shown the details of a camera shutter of a type for which my present spring construction is suitable.

Coming now to the drawing, wherein like reference characters denote like parts throughout:

Fig. 1 is a longitudinal section through a camera equipped with a sliding plate type of shutter and using a spring constructed in accordance with and embodying a preferred form of my invention.

Fig. 2 is an enlarged fragmentary sectional view through a portion of the shutter setting mechanism.

Fig. 3 is an enlarged fragmentary section showing a part of the camera shutter and setting mechanism.

Fig. 4 is an enlarged fragmentary section, taken on line 4—4 of Fig. 1, and

Fig. 5 is a front elevation of a setting dial and pointer which may be used on the camera shown in Fig. 1.

As an embodiment of my invention, I have shown a camera having a body 1, in which there is mounted a mechanism plate 2, this plate supporting a pair of guide rails 3, on which the shutter plates 4 and 5 may slide. Shutter plate 4 has a rearward extension 6, and shutter plate 5 has a similar rearward extension 7, so that the edges of these extensions 8 and 9 may closely approach the focal plane of a film.

In order to move the shutter plates 4 and 5, I have provided a power spring 10, having one end 11 attached to the shutter plate 4, and the other end 12 attached to the shutter plate 5, the intermediate portion 13 of the spring being looped about an upstanding stud 14.

As best shown in Fig. 4, the stud 14 may be attached to the mechanism plate 2 by means of a threaded portion 15. It carries a shoulder 16 which may be used for clamping a washer 17, having an upstanding flange 18 against the mechanism plate. The upstanding flange 18 is positioned to engage a convolution of the spring 10 as it passes about the stud 14, and it is a simple matter to alter the tension of the spring attached to the plate 4 with respect to the tension of the spring attached to the plate 5 by altering the convolution of spring which engages the flange 18.

If it is found, in the initial factory setting, that only a slight adjustment is necessary, the stud 14 may be loosened so that the flange 18 may be swung about the stud 14 through approximately 90° in either direction from the position shown in Figs. 1 and 5. Such a change is usually all that is necessary to properly balance the spring action on the plates 4 and 5. However, if it should occur that such a movement of the washer 17 is insufficient to balance the spring, the spring may be drawn up off of the flange 18 and manually pulled about the stud 14 and the flange 18 may be again engaged with another convolution.

In this way the relative speed of the two plates 4 and 5 can be accurately predetermined, and it is possible to produce exposures which are extremely even from one end to the other when the movement of the shutter plates 4 and 5 have the same characteristics.

In this type of shutter, the exposure is made by releasing the shutter plate 4 in advance of the shutter plate 5. The difference in the time of the release of the two shutter plates provides an opening or slot S between the extensions 8 and 9 of the two shutter plates, and this slot, in crossing an exposure aperture E, makes the exposure.

The shutter plates are set in the following manner: The shutter plate 4 carries a pin 20 which may be engaged by an arm 21 of a lever 22, pivoted on a stud 23 and normally held by a spring 24 in the position shown in Fig. 1. A second lever 25 may be mounted on the top wall 26 of the camera, and when this lever is swung to the right, with reference to Fig. 1, it rocks the lever 22 so that the arm 21, through its engagement with the stud 20, will cause the rearward extensions 8 and 9 of the shutter plates to first overlap and will then move the two shutter plates to the extreme end of the movement in which the plates will be latched and the spring 10 will be tensioned.

Plate 4 will be latched in an operative position by means of the upstanding lug 27 which will be engaged behind the latch member 28. This latch member consists of a lever 29, also pivoted upon the stud 23 and having an end 30 lying beneath a trigger 31 normally held in an upraised position by the spring 32. When the trigger is depressed, as shown, the latch 28 is raised and in the position shown in Fig. 1, the shutter plate 4 has just moved a short distance, having been released from the latch 28.

The shutter plate 5, when tensioned, is held by an upstanding lug 33 which is engaged by a latch 34, carried on the end of an arm 35. This arm consists of two members 35 and 36 which are mounted to telescope in such a manner that a downwardly projecting lug 37 on the end of arm 36 may be moved to and from the releasing latch 28 to vary the time of release of the second shutter plate 5 with respect to the first shutter plate 4.

In Fig. 1, a relatively fast exposure is to be made so that the lug 37 lies close to the latch 28. Consequently, when the shutter 4 has been released as is the case in Fig. 1, the lug 27 moves away from its latch 28, striking the downwardly extending lug 37 and rocking the two-part lever 35, 36 about a pivotal point 38 so that the latch member 34 will be lowered, releasing the latch 33. Fig. 1 shows this latch just after release and just after the shutter plate 5 has started to move.

Since the spring has been carefully balanced, the spring ends 11 and 12 will each exert an equal force upon the two shutter plates 4 and 5, causing them to move with the slot S between them across the exposure aperture E to make an exposure.

If it is desired to make a longer exposure, the separation between the latch 28 and the downwardly extending projection 37 must be increased. This may be done by turning a dial 40, mounted on the front wall of the camera and carried by a shaft 41 which, in turn, carries a mutilated gear 42. When the gear teeth 42 mesh with a pinion 43 and with a second pinion 44, the shaft 38 may be turned. Since the pinion 44 is carried by the shaft 38 and since there is a second pinion 45, also carried by this shaft, a rack 46, meshing with the pinion 45, may be moved. This movement causes arm 36 to partially telescope arm 35, since arm 36 fits within a box-like housing 48 carried by the arm 35.

It is obvious from Fig. 1 that if the pinion 45 is rotated in a clockwise direction, the rack 46 will move the arm 36 and with it the downwardly extending lug to the right. The further this arm moves to the right, the longer the duration of the exposure, although this mechanism is primarily used, as indicated by the dial in Fig. 5, for making relatively fast exposures.

From Fig. 5, it will be noted that the graduations 50 on the dial are arranged from $1/1000$ to $1/50$ of a second in one group, and a second group of graduations 51 are arranged from $1/2$ to $1/25$ of a second. With the mechanism above described, the faster group of exposures can be obtained by varying the width of the slot S between the shutter plates. However, where a longer exposure is desired, as, for instance, the second group, from $1/25$ to $1/2$ a second, the speed of operation of the second shutter plate 5 may be delayed. This may be accomplished in the following manner: The shaft 41 carries a cam 52, preferably provided with a series of steps and with a smooth portion 53 concentric with the shaft. When the shutter is set for slow exposures, an arm 54 of a lever, pivoted at 55, is moved so that a fork 56, which engages a pin 57 on a slide 58, is moved. This slide may be moved upon a pair of upstanding pins 59 because the slide is provided with slots 60 passing around the pins.

The shutter plate 5 is provided with a bracket 62 pivotally supporting, at 63, a toothed rack member 64, this rack member being adapted to mesh with a ratchet wheel 65, carried by a gear train, referred to generally as 66. When the gear train is in the position shown in Fig. 1, it is out of the path of the rack 64, because the shutter is set in Fig. 1 for a rapid exposure.

If the shutter were set for a slow exposure, such as $1/2$ of a second, the arm 54 would lie on one of the steps 52 of the cam, and the slide 58 would be moved into a position in which the rack 64 would have to turn the ratchet 65, and consequently, the start of the movement of the plate 5 would be delayed for a material time. Thus, in a slow exposure, the shutter plate 4 is immediately released and the projection 37 has been moved to its extreme position towards the right of Fig. 1, so that the shutter plate 4 would completely open the aperture E before the lug 27 strikes the downwardly projecting lug 37. At this time the latch 33 would be released from the latch member 34 and plate 5 would start to move. However, the movement would be very slow because the gear train 66 would be turning until the rack 64 slides off the ratchet wheel 65. The spring 10 would then cause the shutter plate 5 to rapidly close the exposure aperture E.

From the above description, it will appear that the generally difficult problem of balancing one spring against another to make two shutter plates slide at exactly the same speed has been overcome by utilizing a single spring, and by balancing the action of the two spring ends through an adjustable member which contacts with a spring convolution. It is a simple matter to change the convolution of the spring 10, which engages the upstanding flange 18 and if approximately the right convolution has been selected, it is also a simple matter to adjust the washer 17 by momentarily loosening the stud 14 so that the two shutter plates can be readily balanced.

Since it always happens that shutter plate 4 must move before shutter plate 5, it is necessary that the force which each spring applies to the shutter plate must be the same where the weight of the two shutter plates is exactly the same. However, if one of the shutter plates should be made slightly heavier than the other, this can be taken care of by properly adjusting the lug 18 with respect to the proper convolution of the spring 10.

What I claim is:

1. In a shutter employing a pair of slidable plates one operable after the other, the combination with a single coiled operating spring, of one end of the spring connected to each of the slidable plates, a support for an intermediate part of the spring, and means carried by the support for maintaining substantially the same spring tension on the two slidable shutter plates.

2. In a shutter employing a pair of slidable plates one operable after the other, the combination with a single coiled operating spring, of one end of the spring connected to each of the slidable plates, a support for an intermediate part of the spring, and means carried by the support about which an intermediate portion of the spring is placed, and means for preventing rotative movement of the spring relative to the support whereby the tension on the spring at each shutter plate may be similar.

3. In a shutter employing a pair of slidable plates one operable after the other, the combination with a single coiled operating spring, of one end of the spring connected to each of the slidable plates, a support for an intermediate part of the spring, and means carried by the support adapted to engage a selected spring convolution whereby the effective length of that portion of the spring acting on each shutter plate may be controlled.

4. In a shutter employing a pair of slidably mounted shutter plates and means for operating one after the other, the combination with a single coiled power spring, of one end of the spring attached to one shutter plate, the other end of the spring attached to the other shutter plate, a stud about which an intermediate portion of the spring is looped, and means fixedly carried by the stud and engageable only with a part of a spring convolution spaced from the stud for holding an intermediate part of the spring in fixed relation to the stud.

5. In a shutter employing a pair of slidably mounted shutter plates and means for operating one after the other, the combination with a single coiled power spring, of one end of the spring attached to one shutter plate, the other end of the spring attached to the other shutter plate, a stud about which an intermediate portion of the spring is looped, and means comprising a washer, and an upstanding flange on the washer, for holding a portion of the spring in a fixed position relative to the stud.

6. In a shutter employing a pair of slidably mounted shutter plates and means for operating one after the other, the combination with a single coiled power spring, of one end of the spring attached to one shutter plate, the other end of the spring attached to the other shutter plate, a stud about which an intermediate portion of the spring is looped, and means comprising a washer, and an upstanding flange on the washer, for holding a portion of the spring in a fixed position relative to the stud, and a shoulder on said stud, for clamping the washer with said upstanding lug in a position to equalize the pull exerted by each end of said spring on the slidable shutter plates.

JOSEPH MIHALYI.